United States Patent [19]

Miller et al.

[11] Patent Number: 5,627,421
[45] Date of Patent: May 6, 1997

[54] HIGH EFFICIENCY DRIVE CIRCUIT FOR AN ACTIVE MAGNETIC BEARING SYSTEM

[75] Inventors: Lance F. Miller, Rockford; Kenneth J. Eakman, Oregon, both of Ill.

[73] Assignee: Barber-Colman Company, Loves Park, Ill.

[21] Appl. No.: 331,306

[22] Filed: Oct. 28, 1994

[51] Int. Cl.[6] ................................... H02K 7/09
[52] U.S. Cl. .................... 310/90.5; 310/90; 310/51; 318/620; 318/628; 318/632; 318/633; 318/635
[58] Field of Search .............. 310/90, 90.5; 318/620, 318/628, 632, 633, 63 T

[56] References Cited

U.S. PATENT DOCUMENTS

| | | | |
|---|---|---|---|
| 3,937,533 | 2/1976 | Veillette | 308/10 |
| 4,392,693 | 7/1983 | Habermann . | |
| 4,417,772 | 11/1983 | Robinson | 308/10 |
| 4,686,404 | 8/1987 | Nakazeki et al. | 310/90 |
| 4,841,184 | 6/1989 | Chen et al. | 310/90 |
| 4,879,500 | 11/1989 | Kanemitsu | 318/632 |
| 4,920,290 | 4/1990 | Murakami et al. | 310/90.5 |
| 5,003,211 | 3/1991 | Groom | 310/90.5 |
| 5,036,236 | 7/1991 | Wilson | 310/90 |
| 5,053,662 | 10/1991 | Richter | 310/90.5 |
| 5,130,589 | 7/1992 | Kanemitsu | 310/90 |
| 5,140,209 | 8/1992 | Whorlow | 310/90 |
| 5,155,402 | 10/1992 | Bichler | 310/90.5 |
| 5,247,219 | 9/1993 | Nakagawa et al. | 310/90 |
| 5,256,952 | 10/1993 | Yoneyama et al. | 318/629 |
| 5,300,841 | 4/1994 | Preston et al. | 310/90 |
| 5,309,075 | 5/1994 | Yokoe et al. | 318/608 |
| 5,347,190 | 9/1994 | Lewis et al. | 310/90 |
| 5,355,042 | 10/1994 | Lewis et al. | 310/90 |

OTHER PUBLICATIONS

*Semiconductor Databook and Application Notes/ 1989–1990*, Unitrode Semiconductor Products brochure, 1989.

*Primary Examiner*—Thomas M. Dougherty
*Assistant Examiner*—Elvin G. Enad
*Attorney, Agent, or Firm*—Leydig, Voit & Mayer, Ltd.

[57] ABSTRACT

A plurality of electromagnetics in an array surround a shaft, with current controlled in the coils of the electromagnets to support the shaft at a desired position approximately centered between the electromagnets. Shaft position sensors provide feedback to a control system for modulating the current to the electromagnet coils, which are arranged in pairs on opposite sides of the shaft. A drive circuit for each coil includes first and second switching transistors which connect the coil to the power supply to transfer a current pulse to the coil. A pair of circulating diodes begin conducting when the transistors turn off, and return power to the supply. A control circuit for the drive circuits interleaves on and off intervals for the coils in the electromagnet pairs so that one coil of the pair is being switched off at about the same time as the other coil of the pair is being switched on. The result is that the energy being returned to the power supply by the off-turning coil is diverted, at least in part, to the on-turning coil, thereby to reduce net current drain from the power supply.

10 Claims, 8 Drawing Sheets

HIGH EFFICIENCY DRIVE CIRCUIT FOR AN ACTIVE MAGNETIC BEARING SYSTEM

FIELD OF THE INVENTION

This invention relates to active magnetic bearings, and more particularly to a high efficiency drive circuit for such magnetic bearings.

BACKGROUND OF THE INVENTION

Magnetic bearings are used for supporting shafts in various types of machinery and instruments. Passive magnetic bearings utilize only permanent magnets and have no means for electronic control. Active magnetic bearings utilize electromagnets and have associated electronic controls for controlling the current through the electromagnets and thereby the position of the shaft. Hybrid systems utilize both permanent magnets and electromagnets, with electronic controls for the latter. Active magnetic bearing systems provide the most reliable and complete form of control, and thus are the preferred magnetic bearing type for the present invention.

Magnetic bearings can be radial or axial. In active radial magnetic bearings, several electromagnets are spaced angularly around a shaft and, when energized, produce opposed magnetic forces which cause the shaft to levitate in the free space defined by the array of electromagnets. Shaft sensors detect the position of the shaft and vary the energization of the electromagnets in such a manner as to keep the shaft centered precisely on a desired axis. Axial magnetic bearings act as thrust bearings to maintain the axial position of the shaft. They are controlled in a similar fashion to radial magnetic bearings, but typically operate in conjunction with a disk supported on the shaft and act to maintain the disk in a predetermined relationship between a pair of opposed electromagnetic coils.

In a magnetic bearing system, the shaft is typically levitated before rotation, and the magnetic bearings support the shaft from that point through its entire operating range. Any loads to which the machine is subjected, such as vibrational loads and the like, are thus applied to the magnetic bearings. The control systems are adapted to compensate for varying loads to maintain the shaft in a predetermined centered position levitated within the bearings.

Because the shaft must be continually supported, the electromagnets for the bearings must be continuously energized. In some application, the amount of power consumed by the bearings is not of great consequence. Linear amplifiers which continuously drive opposed coils in a pair can be utilized, and the currents in the linear amplifiers balanced to create opposed forces which maintain the shaft levitated in a centered position between the bearings.

However, in many cases, power consumption by the magnetic bearings is a factor. For example, it is often desired to reduce power consumption in applications where only a limited amount of power is available. Furthermore, in situations where the increased heat load generated by excess power dissipated in the electromagnets of the bearings is a factor, increased efficiency translates into less heat buildup. Thus, in many applications, such as aircraft applications, the capacity of the power supply is limited, making increased efficiency desirable. In such applications, the bearings will desirably continue to operate over long periods in a reliable fashion, if not subjected to the increased heat buildup resulting from excess power dissipation. Such considerations make it desirable to drive the electromagnets with a minimum of power, concentrating the power on the forces actually needed to levitate the bearings.

The fact that the electromagnets are inductors of reasonably large inductance introduces a number of complications. In switched power supplies, such as pulse width modulated supplies, the current to the coils can be modulated. However, while it is relatively straightforward to rapidly switch an inductor on, if the inductor is switched off in a rapid fashion, the characteristic of an inductor which tends to maintain its current flow, causes the inductor, upon circuit interruption, to appear as a relatively high voltage source. In some applications, shunt diodes are typically coupled across the coil in order to prevent large transients from destroying electronic switching components, and to dissipate the excess energy in the coil. However, the energy which is dissipated is dissipated in the form of current through the coil and the shunt diode, and ultimately contributes to $I^2R$ losses and heat buildup. Thus, not only is the energy which builds up in the coil during the on-interval wasted, but it is wasted in a way which exacerbates the problem by contributing to heat buildup.

In many applications, such as certain aircraft applications, the most readily available power supply is at a voltage level which is not necessarily optimized for the rapid turn-on/turn-off requirements desired for magnetic bearing electromagnets. It is desired to generate variable and highly controllable forces which are directly proportional to a variable control signal. The force generated by a magnetic bearing is directly proportional to the current through the bearing coil. Bandwidth (speed) of a magnetic bearing is dependent on how fast the current can be switched through the coil (di/dt). This current switching speed is governed by the equation V=L*di/dt or stated differently, the coil voltage is equal to the coil inductance times the first derivative of the coil current with respect to time. Since coil inductance is a function of the geometry of the coil and the materials of the magnets, it is relatively constant (assuming a constant magnetic bearing gap and current levels well below the saturation level of the magnetic material) and relatively independent of the coil voltage and current. Accordingly, for a given inductance (L), the current slew rate (di/dt) is dependent on the voltage applied to the coil. Stated differently, di/dt=V/L. It therefore follows that to increase the bearing bandwidth (assuming a constant L), the coil voltage must be increased. The conventional drive circuits, however, clamp the coil voltage on turn-off to a single diode drop (approximately 0.7 volts) and therefore the di/dt in the turn-off portion of the cycle is limited to 0.7/L. One of the advantages of the switching circuit of the present invention is that for the turn-off portion of the cycle, the full supply voltage is applied in reverse bias fashion across the coil. Thus, assuming a 28 volt power supply, according to the present invention, a di/dt of 28/L can be achieved. Thus, the di/dt at coil turn-off is increased by a factor of about 40 over the conventional circuit. Considering particularly the operation at relatively low DC voltages, such as 28 volts, it is expected that situations will be encountered where the tradeoffs between the inductance of the electromagnet, the forces generated, the magnetic circuit, and the desired bandwidth are insufficient at that power supply level using the conventional approach to produce the desired slew rates and bandwidth.

SUMMARY OF THE INVENTION

In view of the foregoing, it is a general aim of the present invention to provide a magnetic bearing system in which the drive circuit is configured for high efficiency operation, and to reduce the drain on the power supply.

The present invention has two interrelated objectives:

According to the first, it is an object to configure a diode circuit which returns power to the power supply rather than dissipating it in an inductor on turn-off, also potentially providing a significant increase in di/dt.

In accomplishing the foregoing object, it is a further object of the present invention to provide a switching circuit for use with the inductor of an electromagnet in an active magnetic bearing system, the switching circuit allowing the power supply to be rapidly applied to the coil upon turn-on, and providing a rapid application of the power supply in reverse bias fashion to the coil on turn-off to return energy from the coil to the supply.

According to the second primary objective, it is an object to phase the operation of a plurality of electromagnets in a magnetic bearing system in such a way that some of the coils are turning off while others of the coils are either on or are turning on. In that way, the off-turning coils, which are configured to return energy to the supply, will have that returned energy drawn on by the on-turning coils, to reduce net power draw from the power supply.

It is a resulting object to provide a magnetic bearing system which is of general utility in that it can be retrofit to an existing system without imposing significant power demands on the available power supplies for the system, such as in aircraft retrofit applications.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
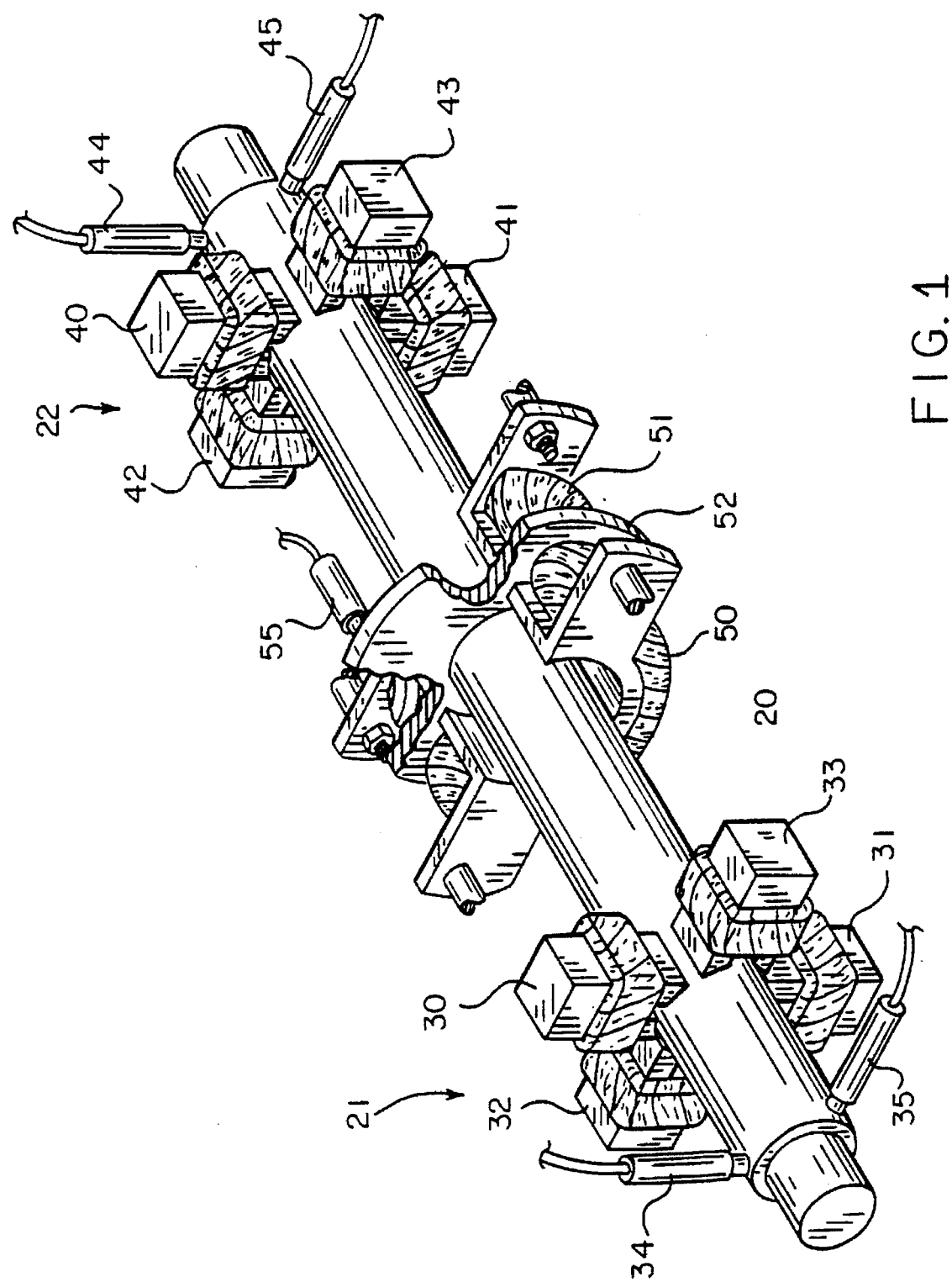
FIG. 1 is a schematic representation of a magnetic bearing system including a pair of radial bearings and a single axial bearing associated with a rotating shaft.

Turning now to the drawings, FIG. 1 shows the general mechanical configuration of a magnetic bearing system 20 exemplifying the present invention. A pair of active radial magnetic bearings are shown generally at 21, 22 supporting a shaft 23 at spaced locations. Each bearing arrangement includes a plurality of electromagnets, and a plurality of position sensors. As will be described in greater detail below, signals derived from the position sensors are fed back to a control system to control the current in the electromagnets and thereby levitate the shaft at a predetermined position generally centered in the gap formed between the electromagnets. Referring in greater detail to FIG. 1, the magnetic bearing assembly 21 is shown as including four coils 30–33. While not necessary for orientation with respect to any particular axis, within the system it is convenient to define orthogonal X and Y axes in order to describe the relative positioning of the elements. To that end, the electromagnets 30 and 31 of the magnetic bearing assembly 21 are defined as the Y axis magnets, and the magnets 32, 33 as the X axis magnets. The shaft 23 is of an electromagnetic material, preferably laminated, and when centered in the gap between the electromagnets has a clearance of on the order of 0.005 inches, for example.

Shaft position sensors 34, 35 are mounted to measure shaft position on the Y and X axes, respectively. While a number of shaft position sensors can be utilized, it is preferred to use the variable reluctance sensor disclosed and claimed in the copending concurrently filed application in the name of Howard E. Taylor, entitled "Position Sensor" and assigned to the same assignee as the present invention.

Turning to the right-hand magnetic bearing assembly 22, it is seen that such bearing is constructed in a similar fashion to left-hand assembly 21. A pair of Y axis coils 40, 41 cooperate with a pair of X axis coils 42, 43, and sensors 44, 45 sense shaft position in the Y and X axes, respectively.

Because the shaft is so freely supported when it levitates, means are provided to maintain an appropriate axial position of the shaft. In the embodiment illustrated in FIG. 1, an active axial magnetic bearing assembly 24 is provided. The physical configuration of the bearing assembly 24 is somewhat different than that of the radial bearings 21, 22, but the overall functionality is about the same. The axial bearing 24 has a pair of electromagnets 50, 51 adapted to function in conjunction with a flange 52 extended from the shaft 23. The flange, like the shaft, is of electromagnetic material. Currents supplied to the electromagnets 50, 51 keep the flange 52 centered in the gap between the electromagnets 50, 51. A position sensor 55 provides a signal indicative of the position of the flange 52, and that signal is used in the feedback circuit for the electromagnets 50, 51 to provide appropriate current levels to center the shaft and maintain the shaft in the centered position.

Other mechanical elements are typically associated with an electromagnetic bearing system and the mechanisms which it drives. However, for purposes of understanding the present invention, the form and configuration of the elements introduced in FIG. 1 is adequate.

Figure 2:
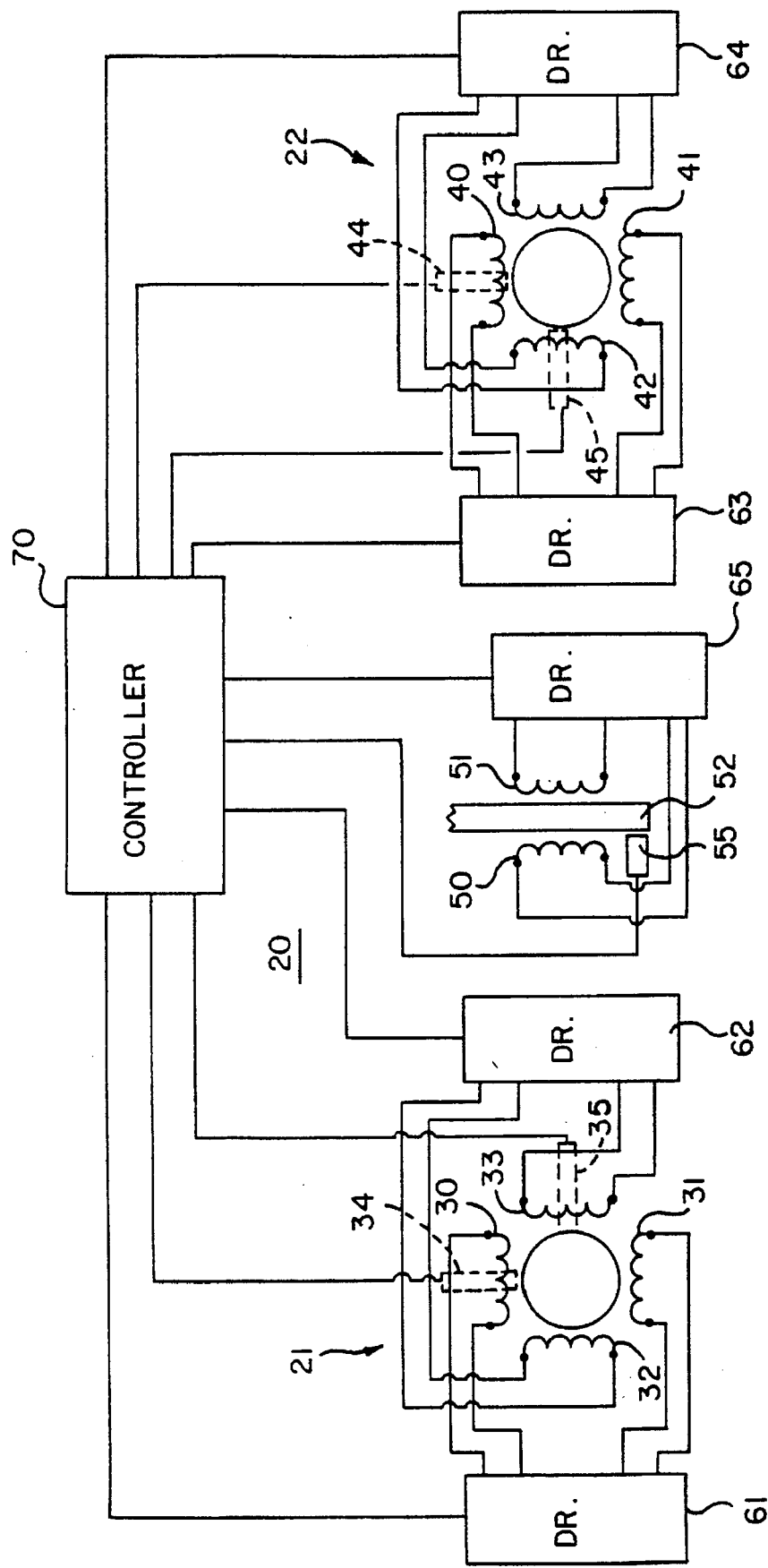
FIG. 2 is a diagram illustrating the interrelationship of the electrical and electronic components of the system of FIG. 1.

With that in mind, turning now to FIG. 2, there is shown the magnetic bearing system 20 of FIG. 1, further illustrating the schematic association of the system with the electronic and drive circuitry. The magnetic bearing arrangement 21 is shown at the left of the drawing, comprised of Y drive coils 30, 31 and X drive coils 32, 33. The right-hand radial magnetic bearing 22 and the axial bearing 24 are similarly illustrated in the drawing.

In practicing the invention, the coils of the electromagnets are arranged in pairs for driving, and drive circuitry is adapted to drive the coil pairs in a manner which minimizes net power drawn from a power source generally indicated at 60. For the sake of convenience, the power supply as shown in FIG. 2 is connected only to the respective drivers. A first driver 61 is arranged to drive the Y direction coil pair 30, 31 of the bearing arrangement 21. Similarly, a second similar coil driver 62 is adapted to drive the X pair 32, 33 of the bearing assembly 21. Additional drivers 63, 64 are adapted to drive the Y pair 40, 41 and X pair 42, 43 of the bearing arrangement 22. Finally, a driver 65 is adapted to drive the pair 50, 51 of the axial thrust bearing.

All of the drivers are driven from a single controller 70, preferably a microprocessor-based controller. As will be described in greater detail below, the controller 70 is a modulated controller of the switching variety which modulates current to the respective controlled electromagnet coils by controlling the on and off times of the drive pulses coupled to those coils. In the preferred embodiment, pulse width modulation is utilized. In a conventional pulse width modulation control, the pulse period is of fixed duration, and the width of the on interval during the fixed duration pulse period is adjusted to modulate current to the output. While pulse width modulation will be described in the present embodiment, and is the presently preferred embodiment, it will be appreciated that other forms of switching modulation can be utilized, such as frequency modulation, pulse position modulation, and the like. As will become more apparent as the description proceeds, no matter what form of modulation is employed, it is simply necessary to cause the modulators for a pair to be out of phase and to drive the associated switches in a pair so that before a given coil is switched off, there is another coil in the pair which has been switched on or is in the process of switching on. In that respect, considering that the typical operating frequency of the modulating systems to be used will be on the order of 40 kHz., and considering the relatively large size of the inductors, there will be very little opportunity for current levels in any coil during a given pulse to reach steady state, so that for so long as the control switches to a given coil are on, one can expect the current to build up through the associated coil for the duration of the on interval.

In the preferred pulse width modulated embodiment of the invention, in the quiescent state, the pulse width is set at a level just above 50%, so that a defined amount of energy is being transferred to the electromagnets, although that amount is rather small. If the duty cycle were set at or below 50%, there would be little energy transfer to the electromagnets because the current always returns to zero during the off cycle and the average value therefore remains small. For duty cycles over 50%, the current does not return to zero during each off cycle, but instead will increase during each cycle until a steady state value is reached. The current change for a given % change of duty cycle is much larger for duty cycles over 50% than for duty cycles under 50%. Therefore, in the preferred embodiment, it is desirable to maintain the quiescent duty cycle near or slightly above 50% to allow for rapid current and resulting force buildup in the case of non-quiescent transient conditions or forces.

It will be seen that in addition to having a circuit connection between the controller 70 and each of the drive circuits 61–65, all of the position sensors 34, 35, 44, 45 and 55 are connected to the controller. The controller uses positional information provided by the shaft sensors to compute demand signals for the pulse width modulation controllers for the respective coils in order to control the pulse width of the drive pulses transmitted to the coils. Preferably, the sensors associated with one of the magnetic bearings are utilized only for drive pulses for that bearing. For example, the sensors 34, 35 are utilized to control the drive pulses only for the electromagnets 30–33. In a particular implementation, it may be possible to utilize only the Y axis sensor 31 for controlling only the Y drive coils 30, 31 and the X sensor 35 for controlling the X drive coils 32, 33. Alternately, the processor 70 has adequate computational power to calculate vectorized information by combining the position signals from the sensors 34, 35 and providing composite drive signals to the electromagnets on the X and Y axes, or on any other coordinate system.

Figure 3:
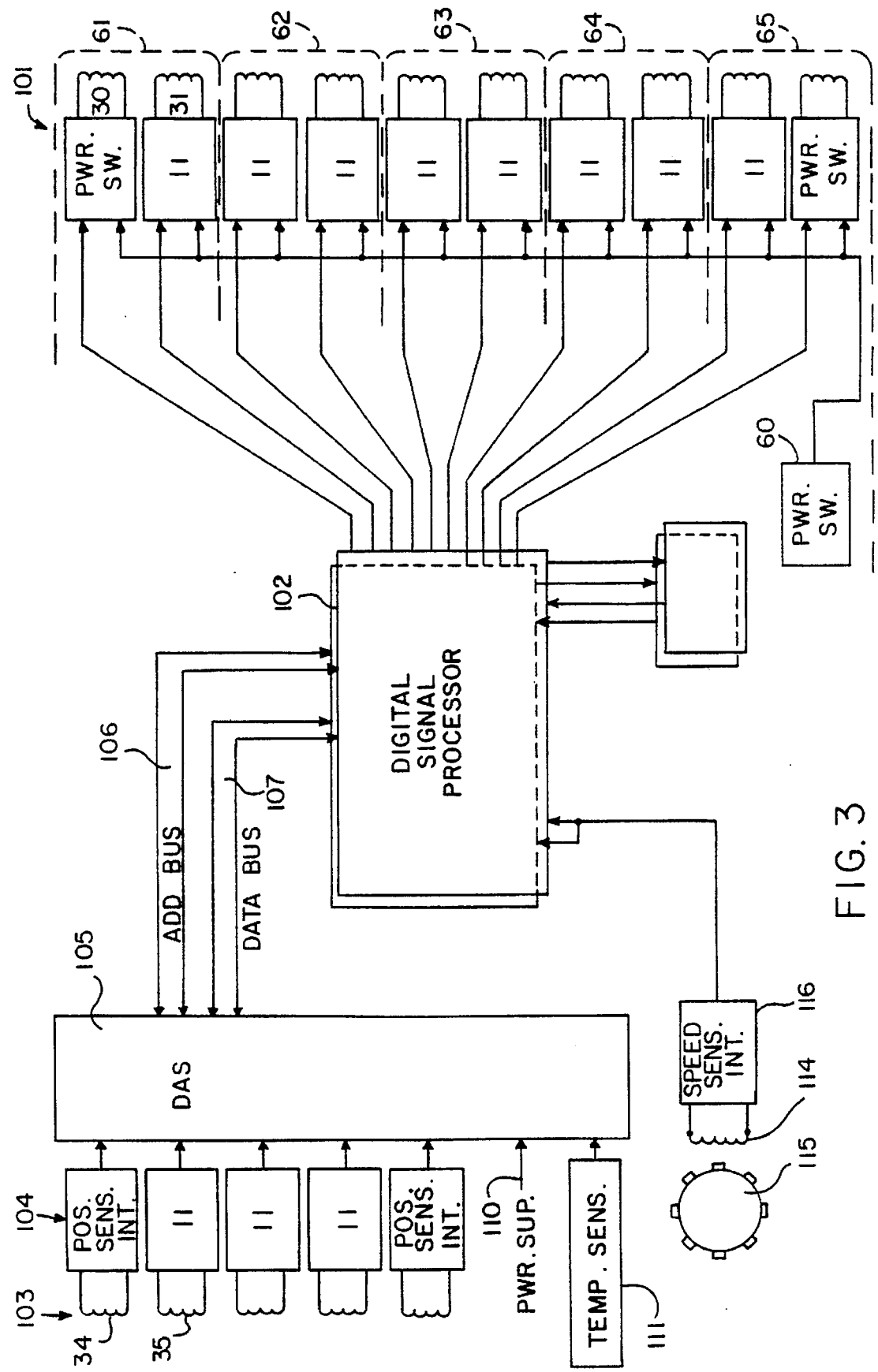
FIG. 3 is a block diagram illustrating the electrical and electronic components of a magnetic bearing system according to the present invention.

FIG. 3 shows another view of the control circuitry with a slightly different perspective than FIG. 2, taken from the point of view of the electronics configuration, without illustrating the physical positional relationship in the magnetic bearing system. FIG. 3 shows a plurality of power switch circuits 100 driving the respective electromagnetic coils 101 which comprise the output elements of the electromagnetic bearing system. A digital signal processor 102 produces a plurality of switch control signals for the respective power switches 100. The power supply 60 is coupled to all of the power switch circuits for coupling power to the electromagnetic coils 101. The position sensors in FIG. 3 are generally indicated at 103 and are coupled through position sensor interfaces 104 to a data acquisition system 105. The data acquisition system 105 in turn is coupled to an address bus 106 and a data bus 107 of the digital signal processor 102. Accordingly, the processor 102, by examining its address and data bus, and responding to interrupts if necessary, acts through the data acquisition system 105 to sample and take readings of the shaft position by means of the shaft position sensors 103 and interfaces 104. The data acquisition system 105 also has connections 110 to the power supply and 111 to a temperature sensor for measuring environmental conditions. Those conditions are reported through the data acquisition system 105 to the digital signal processor which can utilize that information in processing algorithms designed to adjust the drive pulses to the electromagnets accordingly.

Many control schemes for magnetic bearings make use of the actual rotational speed of the shaft. For example, knowing the rotational speed of the shaft will allow the control system to distinguish between systematic vibrations which are a function of the shaft rotation or load vibration, and non-systematic disturbances introduced externally. Accordingly, a speed interface is provided in the form of a speed interface pickup 114 which monitors the shaft 115 to determine the speed of rotation thereof. An interface 116 provides a digital input to the digital signal processor 102 representative of shaft speed.

Turning again to the electromagnets 100, the dashed lines enclosing pairs of the electromagnets relate the showing of FIG. 3 to that of FIG. 2. For example, the upper pair of coils is designated as driver 61, the second pair as driver 62, and so on. The dashed rectangles encompassing the pairs of power switch circuits 100 are open-ended at the left, indicating that to an extent to be described below, the elements of the digital signal processor 102 which produce the pulse width modulated outputs for the pairs are elements of the drive circuits.

Figure 4:
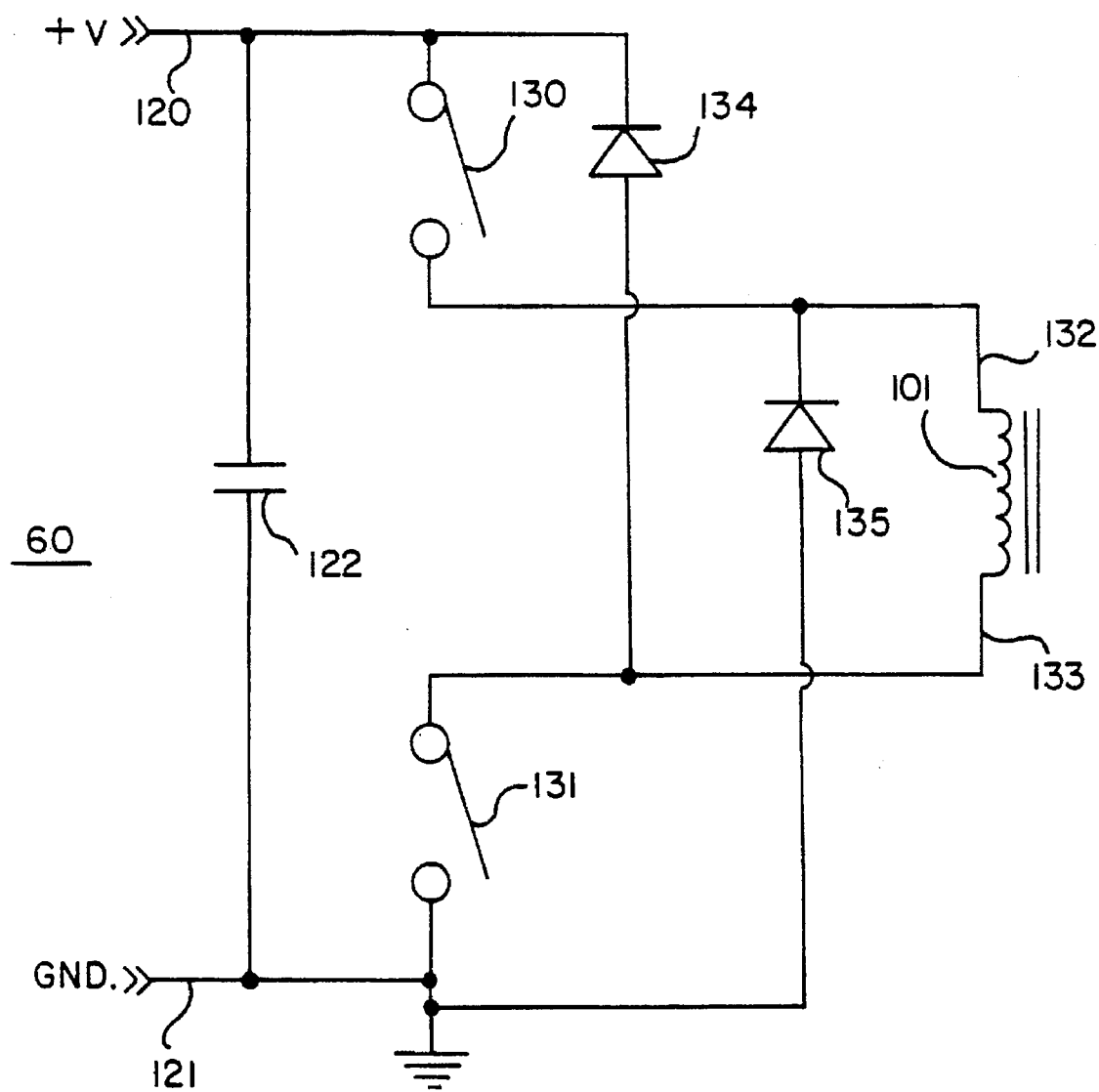
FIG. 4 is a schematic diagram of the switching circuit and its relationship to the electromagnetic coil which is controls, showing the paths for energy transfer to and from the coil.

Turning to FIG. 4, there is illustrated the structure of one of the drive circuits 100 constructed in accordance with the present invention. In a large number of applications for magnetic bearings, efficiency is of significance. While linear amplifiers have been used in the past for driving the electromagnets because the output currents are readily controllable on a continuous basis, they are not preferred according to the present invention because of their inefficiency. Linear amplifiers must operate in a linear range and supply power continuously, and for those reasons are inefficient, wasteful of power, and can be heat generators.

In accordance with the present invention, switching circuitry is provided which is highly efficient in that it is capable of transferring significant power to the electromagnets of the magnetic bearing system, but is also highly efficient in that it recaptures power not consumed in the electromagnets. The power is captured in a way, as will be described in greater detail below, which makes it available to other electromagnets in the system. Furthermore, the system is configured such that the magnetic bearing system is capable of supporting significant loads in reasonably hostile environments (shaft loads which could vary over a wide range) while still being operable with a power supply of a voltage level which is relatively low. While it is possible, of course, to operate a magnetic bearing system according to the invention at a power supply of 80 volts, 100 volts, or 150 volts, as has been done by systems in the past, the present magnetic bearing system also provides the opportunity to operate efficiently and with very good system characteristics at power supplies which are significantly lower than 50 volts. For example, a preferred embodiment of the invention is capable of operating with a power supply of only 28 volts DC. When we refer herein to operating with power supplies at a moderate voltage level, what is being referred to are those supplies which operate below about 50 volts DC.

FIG. 4 shows a single one of the switching circuits 100 of the system of FIG. 3. The operative electromagnetic element, the supporting coil, is shown at 101. The DC power supply 60 which supplies the magnetic coils is shown to the left of the drawing. The DC power supply has a positive bus 120, a return bus 121, and a large storage capacitor 122 is connected across the busses 120, 121. In practicing this aspect of the invention, the coil 101 is isolated from the power supply except by switches, and the switches control the timing of the connection to the power supply and the direction of current flow to and from the power supply. To that end, a pair of controllable switches 130, 131 are provided, a first switch 130 being connected between the positive bus 120 and a positive end 132 of the coil 101. A second switch 131 is connected between the negative terminal (in this example the ground return of the power supply 121) and the negative terminal 133 of the coil 101. The switches open and close together. Upon closure of the switches 130, 131, the power supply 60 is imposed across the coil causing current flow from the terminal 132 to the terminal 133. As a result, the electromagnet generates magnetic force having a magnitude proportional to the current flow through the coil, and that provides a supporting force for the shaft which is levitated in the bearings. When the digital control module (FIG. 3) determines that the switches 130, 131 should be turned off, they open simultaneously. The bottom terminal 133 of the coil begins to charge positively because of the inductance of the coil. However, the current flow through the coil continues because of circulating diodes 134, 135 polled to connect the power supply 60 to the electromagnet 101 in reverse bias fashion. Thus, the diode 134 is connected from the positive bus 120 to the negative terminal 133 of the coil 101. Similarly, the diode 135 is connected from the negative bus 121 to the positive terminal 132 of the coil 101. Thus, with the terminal 133 ringing positive, current flow will continue through the diode 134 and through the capacitance 122 of the power supply, through the diode 135 to the terminal 132 of the coil. As a result, the energy which is in the coil which had caused the terminal 133 to ring positively, is returned to the power supply 60, and in the drawing of FIG. 4 particularly to the output capacitor 122.

It is worthwhile to note the difference in the switching circuit of FIG. 4 from a conventional switching circuit which simply has a shunt diode across the electromagnet coil 101. A typical shunt coil would be polled like the diode 135, but connected from the terminal 133 to the terminal 132. Thus, the positive voltage which would ring up in the coil 101 on turn-off of the switch 130, would simply circulate between the coil 101 and the diode 135, to be ultimately dissipated in those elements. The excess energy which was available in the coil is thus not only wasted, but its dissipation also generates heat. Considering that there are on the order of 10 coils 101 in the system, and that they are switched on at a rapid rate of about 40 kHz., the amount of energy wastage and heat buildup will be apparent. With the circuit configured as shown in FIG. 4, however, the energy available in the coil 100 is returned to the power supply where it can be absorbed in the output capacitor 122 or used in another coil that is on.

In accordance with the present invention, the plurality of switches 100 (FIG. 3) are controlled by the digital signal processor 102 such that the timing results in some of the coils turning off while others of the coils are either conducting or being switched into conduction. As a result, the energy which is available in the off-turning coils, rather than being returned completely to the power supply, is supplied to the coils which are either turning on or are already on.

Figure 5:
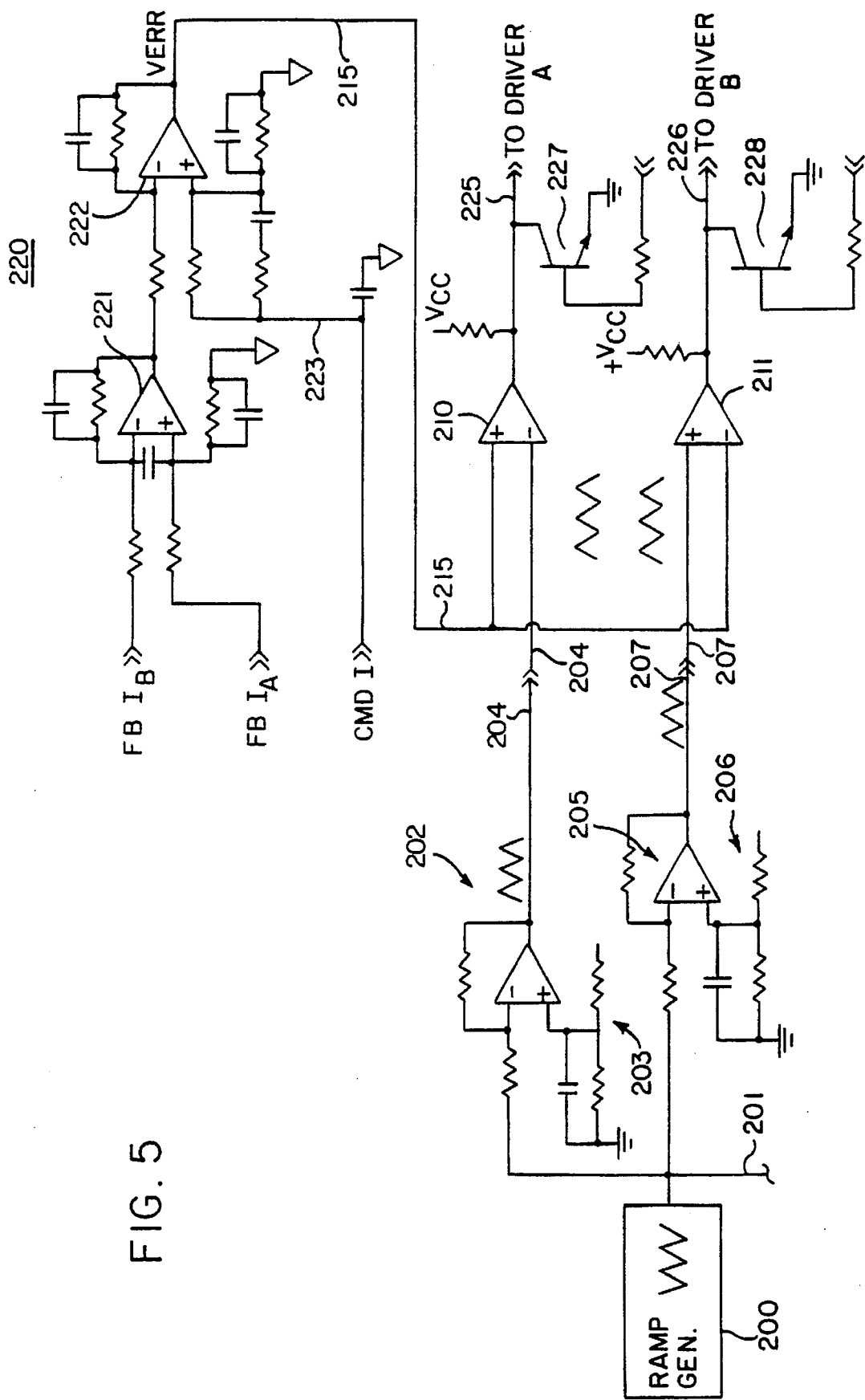
FIG. 5 is a schematic diagram illustrating a pulse width modulated control circuit usable in connection with the present invention.

In the implementation of the invention employing pulse width modulation, the current in the coils of the electromagnets for the magnetic bearings is modulated by the control circuit, and the control circuit preferably performs its modulation by controlling the duty cycle of the voltage pulses supplied to the respective coils. Thus, the coils are all switched at the same generally fixed rate, and the length of time during each switching interval when a coil is conductive determines the average current to the coil. By configuring the coils in complementary pairs, such as the pairs illustrated in FIG. 2, and by adjusting the duty cycle for the coils in a pair so that they track, and by configuring the duty cycle control and the drivers so that one set of complementary driver is turning on while the other is turning off, the net power drain from the power supply is minimized. FIG. 5 is a block/schematic diagram which illustrates circuitry adapted to accomplish the foregoing.

In providing respective time bases for the pulse width modulators for the complementary pair of drivers, it is preferred to use a fixed time base, and to generate a pair of timing waves from that time base which have the appropriate relationship. By using a fixed time base, to the extent the time base varies, both pulse width modulating waveforms will correspondingly be affected in the same manner. To that end, a ramp generator 200 is provided which produces a sawtooth waveform at a predetermined frequency. We prefer to produce a sawtooth which varies between 3 volts and 9 volts and at a 40 kHz. rate. The ramp generator is shown only as a block diagram, since those skilled in the art will be able to configure the necessary operational amplifiers and bias circuitry necessary to achieve the appropriate output.

Figure 7A:
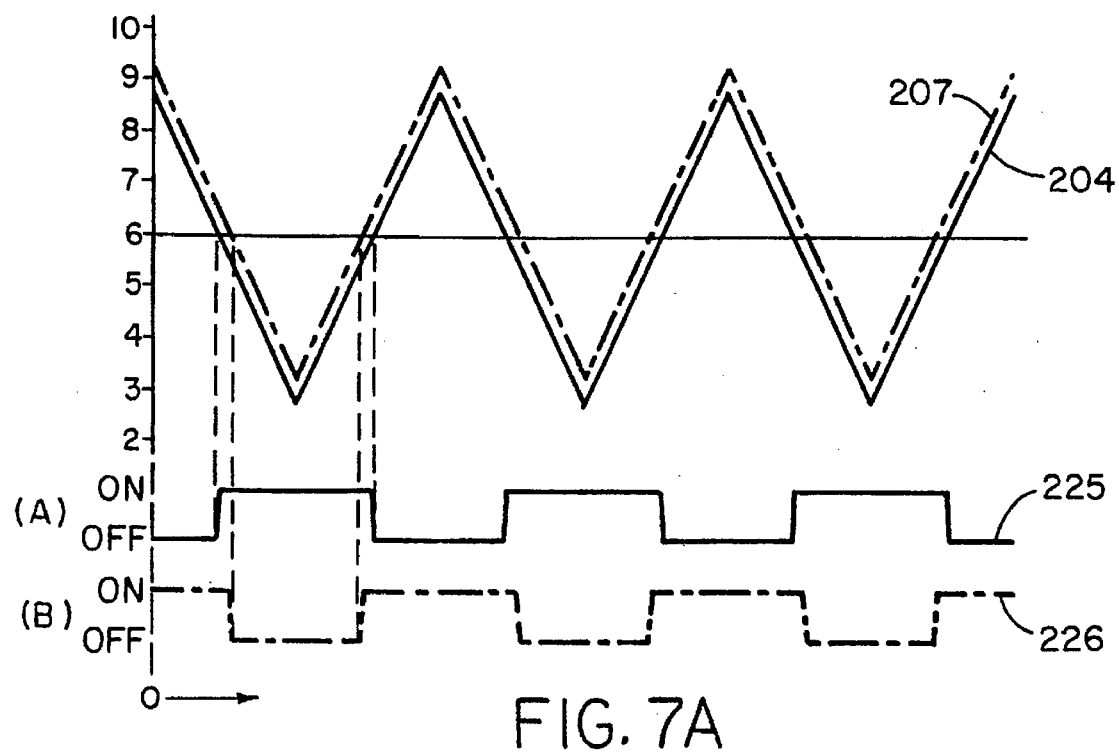
FIGS. 7A–7C are diagrams illustrating certain waveforms which occur in the circuits of FIGS. 5 and 6.

The output of ramp generator 200 is passed to a pair of individual ramp generators which are adapted to produce complementary ramp signals which are offset one from the other, and which will serve as the time base signal for the duty cycle of the respective drivers in a complementary pair. Thus, the output signal from the ramp generator 200, which is coupled to a bus 201, is supplied to a first amplifier 202 which produces an output on a line 204 which is identified as Ramp A, and has a level established by bias network 203. A similar amplifier 205 has the same input ramp 201 coupled thereto, but has a differently adjusted bias network 206 associated therewith to produce on an output line 207 a ramp signal identified as Ramp B. As will be described in greater detail below, a variable resistor in the bias networks 203 adjusts the 40 kHz. sawtooth such that the center point of the sawtooth is shifted between about 0.5 and −0.5 volts from the quiescent 6 volt level of the input 201. Thus, if the Ramp A signal is biased at about the 5.5 volt level, the sawtooth will vary from a magnitude of about 2.5 to about 8.5 volts. A variable resistor in the bias network 206 adjusts the output on line 207 such that the same 40 kHz. sawtooth appears on the output thereof, but is centered at about 6.5 volts to vary between about 3.5 volts and 9.5 volts. Thus, the bias networks are adjusted such that the average bias level on the lines 204, 207 differs by about 0.5 volts in the illustrated embodiment. Turning briefly to FIG. 7A, the sawtooth outputs at terminals 204 and 207 are plotted in the upper portion of the drawing. It is seen that they symmetrically track each other except that they are offset from each other by about 0.5 volts. That offset is taken advantage of in the remaining circuitry to assure that one driver is either on or turning on before the other driver in a complementary pair is allowed to turn off.

Turning again to FIG. 5, it is seen that the complementary ramp signals are provided to a pair of comparators 210, 211. The output of the comparator 210 serves as an output signal to driver A (one of the drivers in a complementary pair), whereas the comparator 211 serves as the output to driver B (the other driver in the complementary pair). For example, the drivers A and B might be the paired Y magnets of one of the magnetic bearings of the FIG. 1 illustration.

Significantly, the ramp A sawtooth 204 is brought to the inverting terminal of the comparator 210, whereas the Ramp B sawtooth on terminal 207 is brought to the non-inverting terminal of the comparator 211. The effect of that is to effectively invert one of the sawtooth waves with respect to the other, or actually to invert the operation of the comparators with respect to the sawtooth waves. The other input of each comparator 210, 211 is coupled to an error signal supplied to the comparators on a line 215. It is seen that the error signal is connected to the non-inverting input of comparator 210 and to the inverting input of comparator 211. The error signal is produced by comparator circuitry generally indicated at 220 which compares the actual currents in the coils in question to the command current being demanded of that pair of coils. It is seen that the comparator 220 has a first amplifier 221 which has inputs coupled thereto which are feedback signals indicative of the current in the respective coils. It will be pointed out later that the driver circuitry includes a small current shunt across which is developed a feedback signal relating to the actual current in the driver. The current feedback signal for driver B is coupled to the inverting input and the feedback signal from driver A is coupled to the non-inverting input of amplifier 221 as shown in the drawing. The output of amplifier 221, with the appropriate phase/frequency characteristic, is a measure of total current in the pair of coils. That signal is coupled as an input to a further comparator 222 which has a command signal coupled thereto on a line 223. The command signal is produced internally by the digital signal processor 102 (FIG. 3) in response to signals from the shaft position feedback sensors. In a known manner, the digital signal processor determines from the position sensors the currents which should be applied to all of the coils in the magnetic bearing system in order to maintain the shaft in its predetermined position. It outputs a demand signal proportional to the current level desired for each pair of coils, the output being coupled to a line such as line 223. For the particular pair of coils in question, that signal is compared by amplifier 222 with the actual current measured in the coils as determined by amplifier 221. The output of the amplifier, with the appropriate lead-lag characteristic determined by those skilled in the art for the system in question, is output on the line 215 and coupled as an error signal to the comparators 210, 211. It will be seen that as the level of the error signal rises, the duty cycle of driver A will increase, whereas the duty cycle of driver B will decrease. As will be described in detail below, the drivers which are connected to the output lines 225, 226 of the pulse width modulator control are turned on whenever the associated lines are high. Thus, if the error signal on line 215 increases, that increasing signal level coupled to the inverting input of amplifier 210 will cause the output on line 225 to be high for a longer portion of the overall pulse period of the duty cycle control. Since the same input on line 215 is coupled to the inverting input of amplifier 211, an increase in the level of that signal will cause the output of the amplifier on line 226 to be high for a lesser portion of each pulse period. As a result, the duty cycle of driver A will increase and that of driver B will decrease, and they will track substantially together.

It is noted in passing that a pair of transistors 227, 228 are coupled to the output lines 225, 226. The function of the transistors 227, 228 (which are driven from shut-down signals generated elsewhere in the circuitry), is simply to assure that the driver signals will go low (i.e., the driver will turn off) for a certain specified minimum of each period of the duty cycle, such as 2%. Timing circuitry selects a period of about 2% at the end of each ramp signal, and drives the transistor 227 or 228 on at the appropriate time for a very brief interval, to assure that the associated driver is brought low for 2% or 3% of the total pulse period. In effect, if the duty cycle control were to attempt to leave the drivers on continuously, this safety feature will assure that the conduction interval does not exceed about 98%, thus ensuring that the high side driver 234 is definitely on when desired.

As indicated in general above, it is preferred to operate the duty cycle control such that in the quiescent lightly loaded condition, the duty cycle of each of the drivers in a complementary pair is just over 50%, such as 51% or 52%. Considering a 40 kHz. operating rate for the duty cycle control, that translates into a pulse repetition rate of about 25 microseconds, or a pulse period (i.e., the total period for which a pulse can occur) of 25 microseconds. Thus, a 50% duty cycle at that rate requires a pulse of just over 12.5 microseconds at a 25 microsecond repetition rate.

If the duty cycle were set at exactly 50% at a 40 kHz. repetition rate, in considering practical inductances for the coil, there would be very little net energy transfer to the coil. When the driver switches on, it transfers a given quantity of energy into the coil, and during the approximately 12.5 microseconds of off time, when the circulating diodes are conducting, substantially all of that energy would be returned to the power source. Thus, there would be little current buildup in the inductor and substantially no energy transfer from the power supply to the inductor.

With the duty cycle at about 51% or 52% at the 40 kHz. repetition rate, all of the energy transferred into the coil during the 51% on-time would not be returned to the power supply during the 49% off-time, and current would build up in the coil. That represents the net energy transfer from the supply to the system, and is the preferred mode of operating in the quiescent condition.

When the bearing is more heavily loaded, such as during periods of high vibration, the shaft sensors will detect the movement of the shaft, the control module will determine that the drivers need additional energy to return the shaft to the desired position, the command signals (223 of FIG. 5) will be increased (or decreased depending on the direction of shaft movement), commanding higher currents from one of the two coils in the complementary pair, and the duty cycles will be adjusted accordingly. Assume that the direction of movement is such that coil A is to be driven harder. As its duty cycle advances from 51% through 70% to 80% or 90%, the corresponding duty cycle of the driver for phase B will decrease in step. Thus, when the duty cycle for driver A is at about 60%, the duty cycle for driver B will be at about 40%. When one is at 70%, the other will be at 30%, etc. That is accomplished by use of the identical but offset pulse width control sawtooth for the respective comparators, by use of the same error signal for both comparators, and by operating one comparator as the inverse of the other.

Figure 7B:
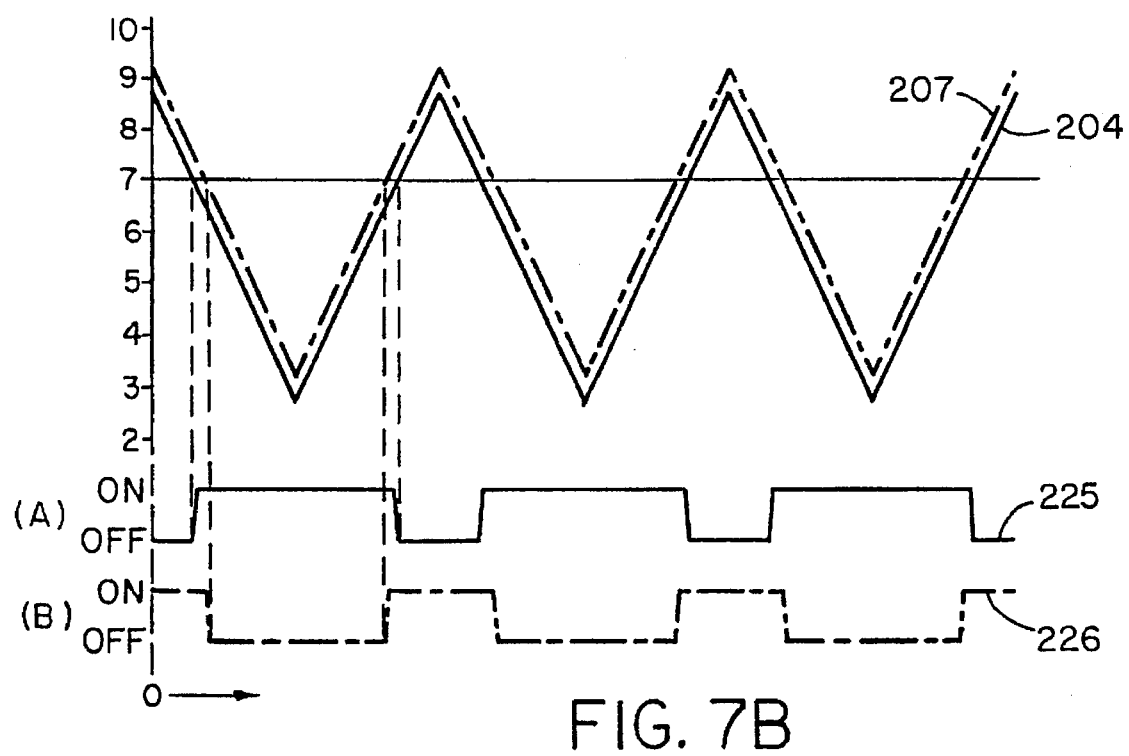
Figure 7C:
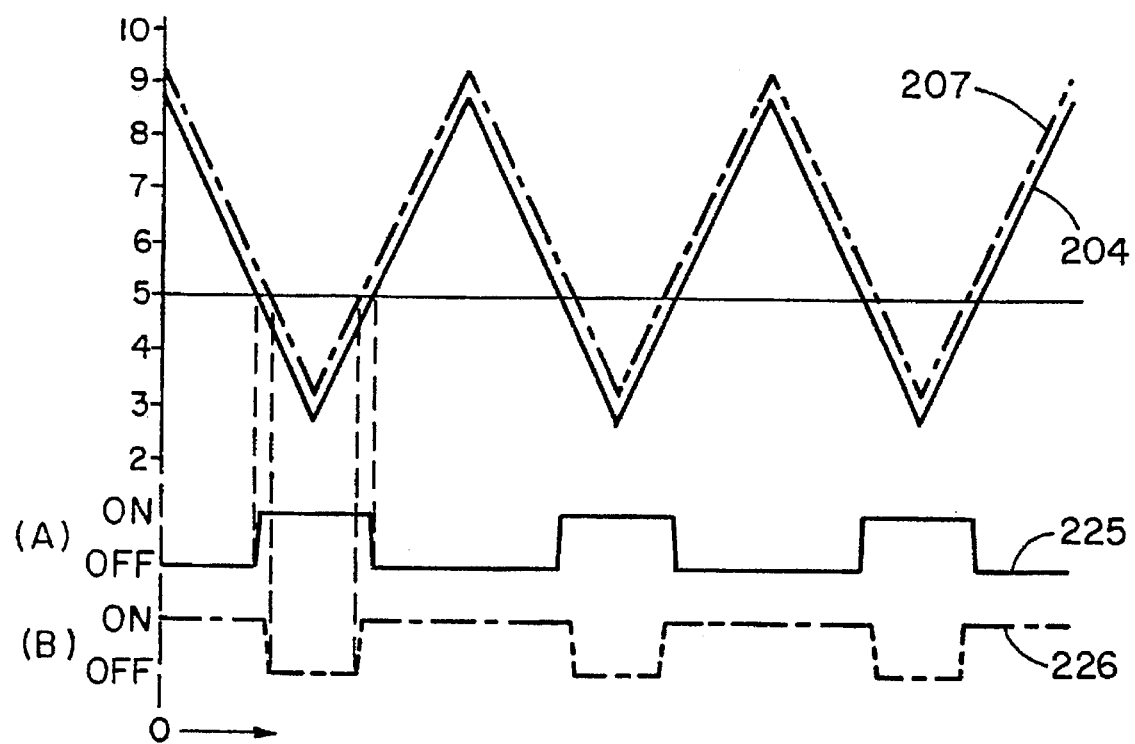

The manner in which that occurs is better appreciated with reference to FIGS. 7A–7C. These figures show the tracking sawtooth modulator signals 204, 207 and three different error voltages representing three different cases for correction, and the resulting drive signals for the A and B drivers of a complementary pair. For purposes of orientation, the A phase is considered to be the lower coil in a Y axis pair, and the B phase the upper coil, such that increasing the drive to the A phase and decreasing the B phase drive results in a downward shaft movement. That correction will, of course, result from the shaft position sensors detecting the position of the shaft as being above its intended position.

The drive signals which are shown in FIGS. 7A–7C are the base drive signals for the drive transistors, and are not accurately representative of current pulse waveforms through the inductors themselves. Keeping in mind that in the preferred embodiment the modulator is operating at a frequency on the order of 40 kHz., and keeping in mind that the inductance of the electromagnets may be on the order of 1 to 2 mH, it will be appreciated that the current rise times and fall times, as well as the voltage waveforms, will be much more sluggish than the relative square waves of the drive pulses. The drive pulses are shown, however, as having a discernible rise time and fall time, as an indication that the actual currents of interest, those flowing in the power circuitry, have rise and fall times which are quite slow. Thus, to the extent there is an interval of a couple of microseconds between the turning on of one driver and the turning off of another, insofar as currents in the drive circuits are concerned, that interval is insignificant, since the time constant of the inductor will be on the order of hundreds of microseconds. Thus, even though the base drive to the switching transistor is switched sharply on at a given point, the current resulting from the turn-on will be ramping up gradually, and if another driver is turned off within a few microseconds of the turn-on, it is as if they were switched on simultaneously, since the current which will continue to flow through the circulating diode is readily diverted to assist the buildup of current in the on-turning coil.

Turning then to FIG. 7A, there is illustrated the condition where the pair of magnetic bearings in the complementary set are in the quiescent condition, and the error voltage in the exemplary embodiment is at about its midpoint, i.e., 6 volts. It is seen that the reference ramp 204 for the A drive is biased to have a center which is about 0.25 volts lower than the sawtooth 207 for the B drive.

Thus, taking the error voltage at 6 volts, it will be seen that with increasing time the reference ramp 204 for the A drive will first cross the error signal line, causing the output 225 to switch on at about the point of crossing. One or more microseconds later, the reference ramp 207 for the B drive will cross the error voltage level, but in this case the operation of the comparator is reversed, and the B drive will switch off at that point. The energy from the off-turning coil is available for supplying current to the A drive coil which had just turned on (compare waveforms 225 and 226). Later in the cycle, the next reference ramp to cross the error voltage, because of the nature of the offset, will be the B drive reference ramp 207, and it will cross the reference in a positive direction which because of the manner in which the inverting and non-inverting inputs to the comparator 211 are connected, will cause the B drive to turn on. That is shown at 226 in FIG. 7A. Within a microsecond or two, the reference ramp 204 will also cross the error voltage level, and it will cross in a positive direction, but because of the oppositely connected comparator, will cause the A drive to turn off. Thus, the energy from the inductor in the off-turning A drive will be available for supply to the B coil which had commenced turning on only microseconds earlier. The circuit will continue to operate in that function, always assuring that one coil has either just turned on, or is on, before a subsequent coil in the complementary pair is turned off, so that there is always a charging inductor available to accept energy being returned from an inductor whose control switch has turned off. FIG. 7A illustrates the situation where the duty cycle of the A and B drives are about matched, at just over 50%. As noted above, that is the quiescent condition.

Turning to FIG. 7B, it is seen there that the error voltage is at a higher level, such as 7 volts, which for a vertical complementary coil pair, represents the situation where the shaft is above its intended position. Thus, it is desired in that situation to drive the lower coil (the A coil) harder than the B coil, and it will be seen that the reference voltage being matched against the same pair of reference ramps achieves that result. As in the prior example, the reference ramp 204 will first cross the error signal line, causing the A driver 225 to switch on. However, that happens earlier in the cycle than in the condition of FIG. 7A. As in the prior example, within microseconds, the reference ramp 207 crosses the error signal level, causing the B drive to switch off. The energy from the B drive coil is thereby transferred to the on-turning A coil. Much later in the cycle, the reference ramp 207 again crosses the error signal level, this time in the positive direction, causing the B drive 226 to turn on as illustrated in the drawing. Within microseconds, the A drive ramp 204 crosses the 7 volt error signal level, causing the A drive 225 to turn off. Comparing waveforms 225 and 226, it will be seen that the duty cycle of the A coil has substantially increased, whereas the duty cycle of the B coil has substantially decreased, with the total amounting to about 100%, and the sequence assuring that one is turning on before the other turn-off has commenced.

Turning briefly to FIG. 7C, there is shown the opposite condition, where the shaft position sensors dictate an error signal which is below the quiescent level, in the example at the 5 volt level. Analyzing the crossings of the reference ramps 204, 207 with the 5 volt error signal in the same way as has been done in the other examples will produce the drive signals 225, 226 illustrated in FIG. 7C. It is seen that the drive signal for the upper coil (coil B) is on much longer than the drive signal for the lower coil (coil A), with the total again amounting to about 100%.

Figure 6:
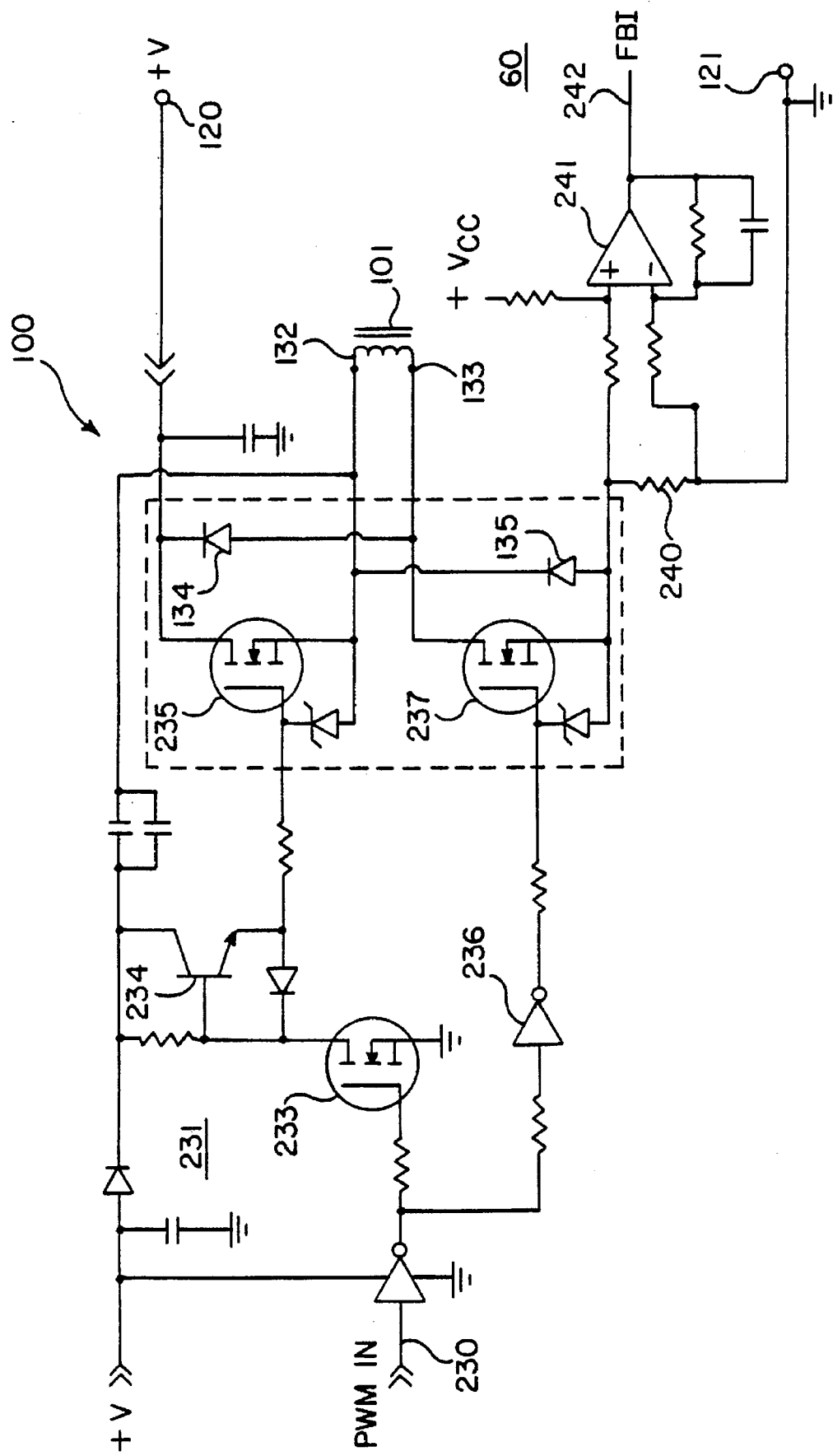
FIG. 6 is a schematic diagram illustrating the electronic elements of the driver circuit used in practicing the preferred embodiment of the present invention.

FIG. 6 shows in more complete form than did FIG. 4 a drive circuit useful in the practice of the present invention. The drive circuit is responsive to the A or B drive signals 225, 226 generated at the output of FIG. 5, and illustrated in FIGS. 7A–7C.

Referring to FIG. 6, it will first be appreciated that two of the circuits illustrated in the figure will be required to service a single complementary pair of pulse width modulated signals. It is seen that an input terminal 230 is provided. In a first drive circuit, the terminal 230 will be connected to the A drive signal from output line 225. In the other identical drive circuit, the terminal 230 will be connected to the B drive output line 226. Referring to the particular circuit elements, it is seen first of all that a power on charging circuit 231 is provided to assure that the high side driver 235 will have a proper gate signal of approximately 12 volts. The drive signal 230 is passed through an inverter 232 to the gate of a MOS FET 233. When the signal from the pulse with modulator driver 225 is high, the inverter 232 will produce a low going signal at the gate of MOS FET 233, preventing the MOS FET from conducting. As a result, the bipolar transistor 234 will turn on, and that will result in turning on the output MOS FET 235. The MOS FET 235 will connect the positive terminal 120 of the power supply 60 through the MOS FET 235 to the positive terminal 132 of the electromagnetic coil 101.

The low going signal at the output of inverter 232 is also inverted by an inverter 236 to provide a high signal at the gate of MOS FET 237 to turn the MOS FET 237 on. Thus, the MOS FETS 235 and 237 will turn on the same time. Turning on of the MOS FET 237 will complete the path for current flow from the negative terminal 133 of the coil 101 to the negative terminal 121 of the power supply 60. That current flow will pass through a shunt resistor 240 intended to act as a current sensor. A properly biased amplifier 241 is connected across the sensing resistor 240 to provide a signal at the output 242 thereof which is a measure of the current flow in the coil 101. Appropriate filtering and phase adjusting circuitry is associated with amplifiers typically used to produce the output signal 242, but the details of the circuitry need not be further described, since they can be adjusted by those skilled in the art to suit their particular requirements. In the illustrated embodiment, the signal at the output 242 has a level which is calibrated to about 250 millivolts per amp of current through the coil 101. The output 242 is coupled to the input FB $I_B$ of the amplifier 221 which, it is recalled, was a comparator which measured the total current in the coils in a complementary pair.

Although not described in detail, it will be seen that associated with the transistors 235, 237 are circulating diodes 134, 135 polled as described in connection with FIG. 4. Thus, whenever the signal on input line 230 returns low, the MOS FETS 235 and 237 will turn off. The circulating current in the coil through the circulating diodes 134, 135 will cause the power supply 60 to be imposed across the coil 101 in reverse bias fashion, allowing the current in the coil to be returned to the power supply. Because the additional drive circuit (identical to that in FIG. 6) which is driven from the output 226 of FIG. 5 had turned its associated coil on before the turn off transistors 235 and 237, the current which flows through circulating diodes 134, 135 will be drawn by the similar coil 101 then being supplied with current by MOS FETS 235, 237 of the associated drive circuit.

It will now be appreciated that what has been provided is a high efficiency driver for a magnetic bearing system which accomplishes the aims and objectives set forth above. A switching circuit is associated with each coil of the magnetic bearing system, and is adapted for both rapid turn on and rapid turn off, and during the turn off phase is adapted by way of circulating diodes to return energy to the power supply. The coils of the magnetic bearing system are arranged in pairs, and the modulation of the pairs is arranged such that whenever a coil is about to be turned off, an associated coil has turned on or is being turned on, such that the current being returned through the circulating diodes of the off-turning coil is available to supply the on-turning coil, reducing the net drain from the power supply. Furthermore, the fact that the power supply is imposed in reverse bias fashion across the off-turning coil, enhances the di/dt applied to the coil, and thus achieving greater bandwidth than might ordinarily be achieved.

What is claimed is:

1. A magnetic bearing system in which at least one magnetic bearing array supports a shaft;

the magnetic bearing array having pairs of opposed electromagnets arranged on diametrically opposite sides of the shaft, and a plurality of pairs at equiangular displacements about the shaft;

a shaft position sensor for the magnetic bearing array;

a drive circuit for the coil of each electromagnet for supplying current thereto from a DC power supply having positive and negative busses;

each drive circuit including a first switch connected between the positive bus and a positive side of the coil and a second switch connected between the negative bus and a negative side of the coil, and circulating diodes connected from the negative side of the coil to the positive bus and from the positive side of the coil to the negative bus; and a control circuit for activating the drive circuits in a cyclical sequence, switched modulation means in the control circuit for modulating current flow to the coils in each electromagnet pair in dependence on signals received from the shaft position sensor, the control circuit interleaving the on and off intervals for the coils in the electromagnet pairs so that one coil of the pair is being switched off at about the same time as the other coil of the pair is being switched on, the circulating diodes being polled to return energy from a coil turning off to the power supply to make the returned energy available to the coil turning on thereby to reduce net current drain from the power supply.

2. The magnetic bearing system as set forth in claim 1 wherein the circulating diodes are connected and polled such that the circulating diodes impose the full voltage of the power supply in reverse bias fashion across the coil which is turning off.

3. The magnetic bearing system as set forth in claim 2 wherein the DC power supply produces a relatively low voltage of less than 50 volts.

4. The magnetic bearing system as set forth in claim 1 wherein the magnetic bearing array has an X axis pair of coils and a Y axis pair of coils, and the shaft position sensor comprises an X axis sensor and a Y axis sensor.

5. The magnetic bearing system as set forth in claim 1 wherein the switched modulation means comprises a pulse width modulation system having a fixed period, the pulse width modulating system controlling the duty cycle of current pulses in the respective coils.

6. The magnetic bearing system as set forth in claim 5 wherein the pulse width modulation system has a quiescent level in which the duty cycle of current pulses in the respective coils of each electromagnet pair is at the same level, slightly in excess of 50%.

7. The magnetic bearing system as set forth in claim 6 in which the pulse width modulation system modulates current flow in non-quiescent conditions by increasing the duty cycle to one coil in an electromagnet pair and decreasing the duty cycle to the other coil in said pair.

8. The magnetic bearing system as set forth in claim 5 wherein the pulse width modulating system includes a pair of comparators, an error signal being coupled to each of the comparators, and first and second modulating waveforms being coupled to the respective comparators, the modulating waveforms comprising respective sawtooth waveforms offset with respect to each other.

9. The magnetic bearing system as set forth in claim 8 in which the error signal and modulating waveforms are connected to the respective comparators in such a way that the comparators operate in inverted fashion with respect to each other.

10. The magnetic bearing system as set forth in claim 9 in which the modulating waveforms comprise respective sawtooth waveforms biased to be offset with respect to each other, the bias being adjusted so that one of the waveforms leads the other in approaching the error signal when said waveforms approach the error signal in a positive direction, and the other of said waveforms leads the first when approaching the error signal in the negative direction.

* * * * *